(12) United States Patent
Lai et al.

(10) Patent No.: US 9,773,152 B2
(45) Date of Patent: Sep. 26, 2017

(54) LIGHT GUIDING STRUCTURE FOR FINGERPRINT RECOGNIZING SHEET

(71) Applicant: Concraft Holding Co., Ltd., Grand Cayman (KY)

(72) Inventors: Shih-Chia Lai, Grand Cayman (KY); Yong-Hong Jiang, Grand Cayman (KY)

(73) Assignee: CONCRAFT HOLDING CO., LTD., Grand Cayman (KY)

( * ) Notice: Subject to any disclaimer, the term of this patent is extended or adjusted under 35 U.S.C. 154(b) by 256 days.

(21) Appl. No.: 14/808,482

(22) Filed: Jul. 24, 2015

(65) Prior Publication Data
US 2017/0024599 A1 Jan. 26, 2017

(51) Int. Cl.
*H04N 7/18* (2006.01)
*G06K 9/00* (2006.01)
*G06K 9/20* (2006.01)
*H04N 5/225* (2006.01)

(52) U.S. Cl.
CPC ....... *G06K 9/0004* (2013.01); *G06K 9/00046* (2013.01); *G06K 9/2027* (2013.01); *H04N 5/2257* (2013.01); *H04N 5/2252* (2013.01)

(58) Field of Classification Search
None
See application file for complete search history.

(56) References Cited

U.S. PATENT DOCUMENTS

2009/0169071 A1* 7/2009 Bond ............... A61B 5/1172
382/124
2012/0218397 A1* 8/2012 Monden ............ G06K 9/0012
348/77

FOREIGN PATENT DOCUMENTS

CN 204806117 U * 11/2015 ............ F21S 8/00

* cited by examiner

*Primary Examiner* — Heather Jones
(74) *Attorney, Agent, or Firm* — Rabin & Berdo, P.C.

(57) ABSTRACT

A light guiding structure for fingerprint recognizing sheet is adapted between a circuit board and a protecting sheet for encompassing an image capture device. The light guiding structure includes a frame, side-emitting LEDs, and a light guiding sheet. The middle portion of the frame is defined as a hollowed portion. Conductive pairs are located on the frame and extended out of the frame to form a first contact and a second contact. The side-emitting LEDs are assembled to the frame and electrically connected to the conductive pairs. The light guiding sheet covers on the hollowed portion. The side-emitting LEDs are assembled around the periphery of the light guiding sheet. The light guiding structure can be directly assembled on the circuit board and encompass the image capture device, and therefore an electronic device can be provided with a fingerprint recognizing sheet having the light guiding structure.

10 Claims, 8 Drawing Sheets

LIGHT GUIDING STRUCTURE FOR FINGERPRINT RECOGNIZING SHEET

BACKGROUND

Technical Field

The instant disclosure relates to a light guiding structure for fingerprint recognizing sheet. In particular, the instant disclosure relates to a light guiding structure for fingerprint recognizing sheet which is applicable to an electronic device, adapted to allow a finger to lie on, and providing illumination during capturing the fingerprint of the finger.

Related Art

Electronic devices, for example, smart phones, notebook computers, flash disks, or even smart door locks, etc., which are provided for storing personal documents, such as mails, photos, or other document files, are required to have unlock and security function.

A conventional electronic device adopted a password authentication method to prevent important information inside the electronic device from being stolen. However, in order to remember the password easily, users may choose their birthday or birthdays of their family members as the passwords. As a result, people with bad intention may get the passwords through various ways, and the important information would be stolen or event exposed to public.

Therefore, in order to improve the security for the electronic device, a fingerprint recognizing function is adopted in the conventional electronic device. One of the advantages of the fingerprint recognizing function is that fingerprint is unique and cannot be replicated, so that the security for electronic devices may be greatly improved. FIG. 1 illustrates a conventional smart phone A. Smart phone is one of the necessities in the daily life. Many users use smart phones to send and receive mails or to store personal document files.

Therefore, a great number of conventional smart phones have the fingerprint recognizing function so as to be capable of performing theftproof function. As shown, the conventional smart phone A includes a fingerprint recognizing region B which allows a user to unlock the smart phone A through fingerprint authentication.

A conventional fingerprint recognizing device includes a circuit board, an image capture device, a light guiding sheet, and LEDs. The image capture device is assembled on the circuit board. The light guiding sheet is disposed above the light guiding sheet. The LEDs are disposed around the periphery of the light guiding sheet, so that the light emitted from the LEDs would be entered into the light guiding sheet. Therefore, when a user put his/her finger on the fingerprint recognizing region B of the fingerprint recognizing device, the brightness of the place where the finger is put on can be increased so as to allow the image capture device to read the fingerprint for fingerprint authentication.

However, for the conventional fingerprint recognizing device, the LEDs are assembled on the circuit board along with the image capture device. Therefore, the manufacturing of the fingerprint recognizing device becomes complicated, and the manufacturing cost is increased.

Another conventional fingerprint recognizing device integrates the image capture device, the light guiding sheet, and the LEDs as an integrated component. And then, the integrated components are secured with the circuit board. Nevertheless, such fingerprint recognizing device is large. As a result, when a smart phone includes the fingerprint recognizing device, the smart phone would be too large to allow a user to hold or carry conveniently.

Consequently, it is an issue that how to make a fingerprint recognizing device which is applicable to an electronic device, adapted to allow a finger to lay on, providing illumination during capturing the fingerprint of the finger, and light weighted.

SUMMARY

In view of these problems, an exemplary embodiment of the instant disclosure provides a light guiding structure for fingerprint recognizing sheet. The light guiding structure is adapted between a circuit board and a protecting sheet for encompassing an image capture device. The light guiding structure comprises a frame, a plurality of side-emitting LEDs, and a light guiding sheet. The frame has a hollowed portion at the middle portion thereof. A plurality of conductive pairs is located on the frame. Each of the conductive pairs comprises a first conductive portion and a second conductive portion spaced from the first conductive portion. The first conductive portion and the second conductive portion are respectively extended to and beneath a lower surface of the frame to form a first contact and a second contact. The side-emitting LEDs are assembled to the frame and electrically connected to the conductive pairs. The light guiding sheet covers on the hollowed portion of the frame, so that the side-emitting LEDs are assembled around the periphery of the light guiding sheet.

Accordingly, the light guiding structure can be directly assembled on the circuit board and encompass the image capture device, and therefore an electronic device can be provided with a fingerprint recognizing sheet having the light guiding structure. Based on this, the manufacturing of the electronic device can be simplified, and the electronic device can be light weighted.

In some embodiments, a recessed portion is recessed from the upper surface of the frame. The recessed portion is located at the periphery of the hollowed portion, and the conductive pairs are assembled at the recessed portion.

In some embodiments, a support base is protruded toward the hollowed portion from the recessed portion. The support base is located at the periphery of the hollowed portion to support the light guiding sheet.

In some embodiments, the first conductive portions are series-connected with each other by a first connecting portion, and the second conductive portions are series-connected with each other by a second connecting portion. The first connecting portion is assembled at the upper surface of the frame, and the second connecting portion is assembled at the support base.

In some embodiments, a plurality of through holes is defined on the recessed portion and through the frame. The first conductive portions and the second conductive portions are passing through the through holes and extended to the lower surface to form the first contact and the second contact.

In some embodiments, four protruded portions are respectively formed at four corners of the light guiding sheet and protruded outward. In some embodiments, two protruded portions on the same diagonal line are corresponding with each other in shape.

Detailed description of the characteristics and the advantages of the disclosure is shown in the following embodiments. The technical content and the implementation of the disclosure should be readily apparent to any person skilled in the art from the detailed description, and the purposes and the advantages of the disclosure should be readily understood by any person skilled in the art with reference to content, claims and drawings in the disclosure.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
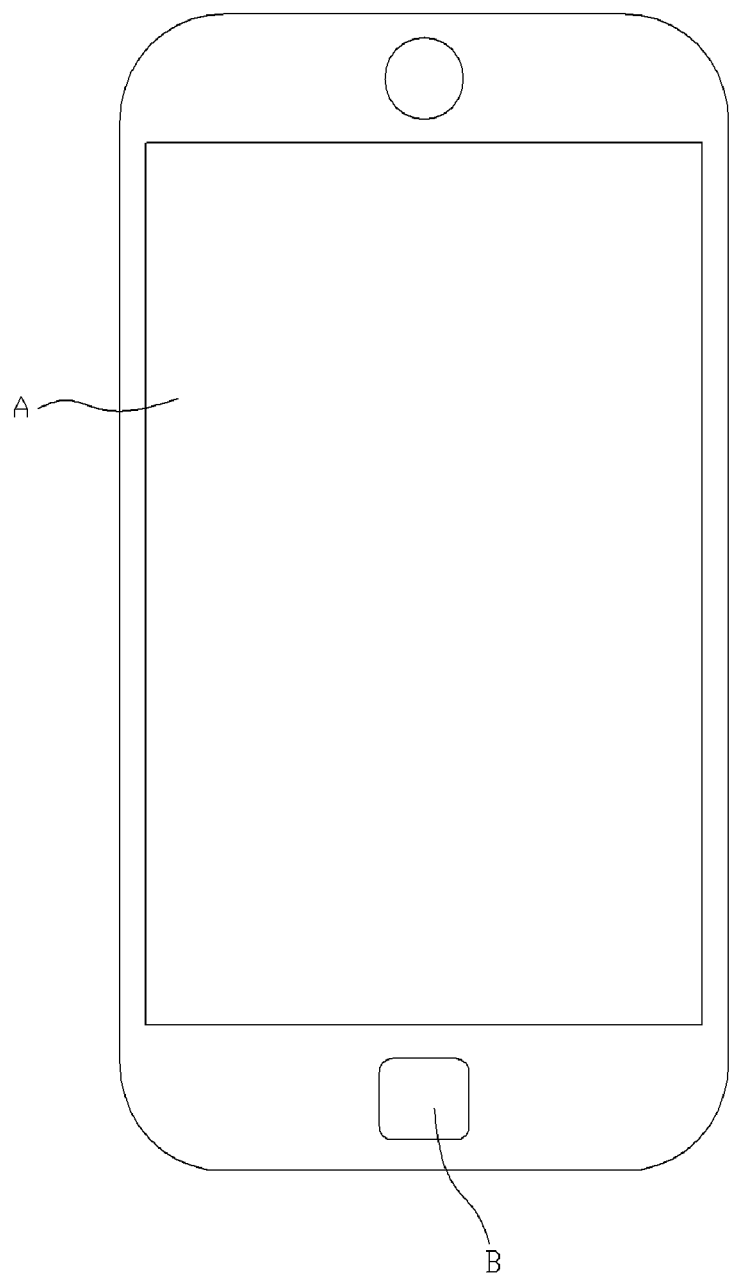
FIG. 1 is a schematic top plan view of a conventional electronic device.
Figure 2:
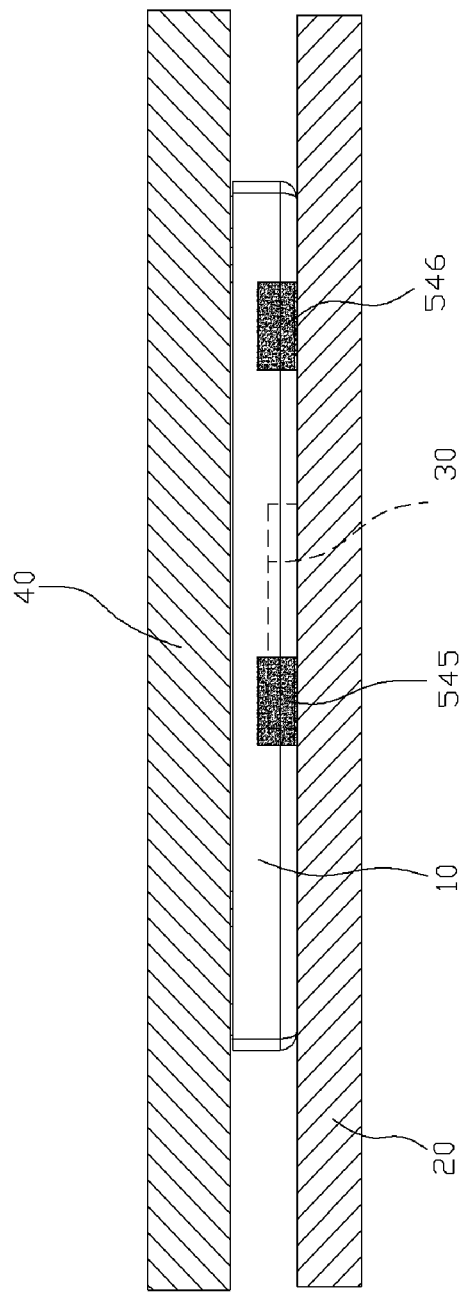
FIG. 2 is a sectional view illustrating a light guiding structure for fingerprint recognizing sheet is in an operational state, according to an exemplary embodiment of the instant disclosure.

FIG. 2 provides a light guiding structure for fingerprint recognizing sheet. The light guiding structure 10 is adapted to a circuit board 20 and encompasses an image capture device 30.

Here, the light guiding structure 10 is adapted to a smart phone, embodiments are not limited thereto. A protecting sheet 40 is covered on the light guiding structure 10. Therefore, the light guiding structure 10 is securely sandwiched between the circuit board 20 and the protecting sheet 40. In this embodiment, the protecting sheet 40 may be made of glass, plastic, or any transparent materials.

Figure 3:
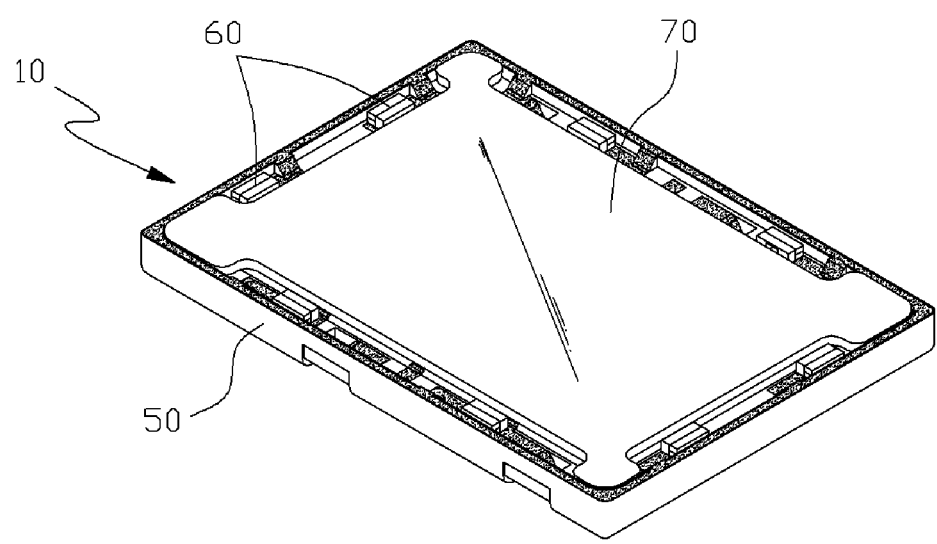
FIG. 3 is a perspective view (1) of the light guiding structure of the exemplary embodiment.
Figure 4:
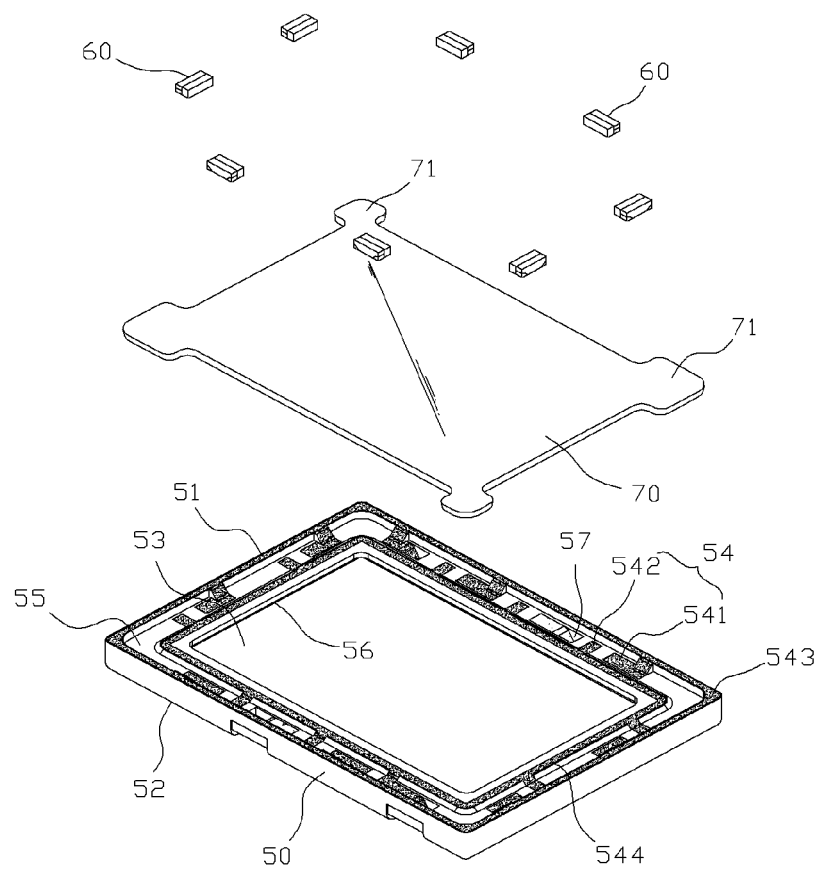
FIG. 4 is an exploded view of the light guiding structure of the exemplary embodiment.

As shown in FIG. 3 and FIG. 4, the light guiding structure 10 comprises a frame 50, a plurality of side-emitting LEDs 60, and a light guiding sheet 70.

The frame 50 has an upper surface 51 and a lower surface 52 opposite to the upper surface 51. A hollowed portion 53 is defined at the middle portion of the frame 50, i.e., the middle portion of the frame is hollowed. At least one conductive pair 54 is formed on the frame 50. Each of the conductive pairs 54 comprises a first conductive portion 541 and a second conductive portion 542 spaced from the first conductive portion 541. In this embodiment, a plurality of conductive pairs 54 is formed on the frame 50, the first conductive portions 541 are connected with each other in series connection, and the second conductive portions 542 are connected with each other in series connection.

In this embodiment, a recessed portion 55 is recessed from the upper surface 51 of the frame 50. The recessed portion 55 is located at the periphery of the hollowed portion 53. Specifically, a support base 56 is protruded toward the hollowed portion 53 from the recessed portion 55. The support base 56 is located at the periphery of the hollowed portion 53. The first conductive portions 541 and the second conductive portions 542 of the conductive pairs 54 are assembled at the recessed portion 55.

Figure 5:
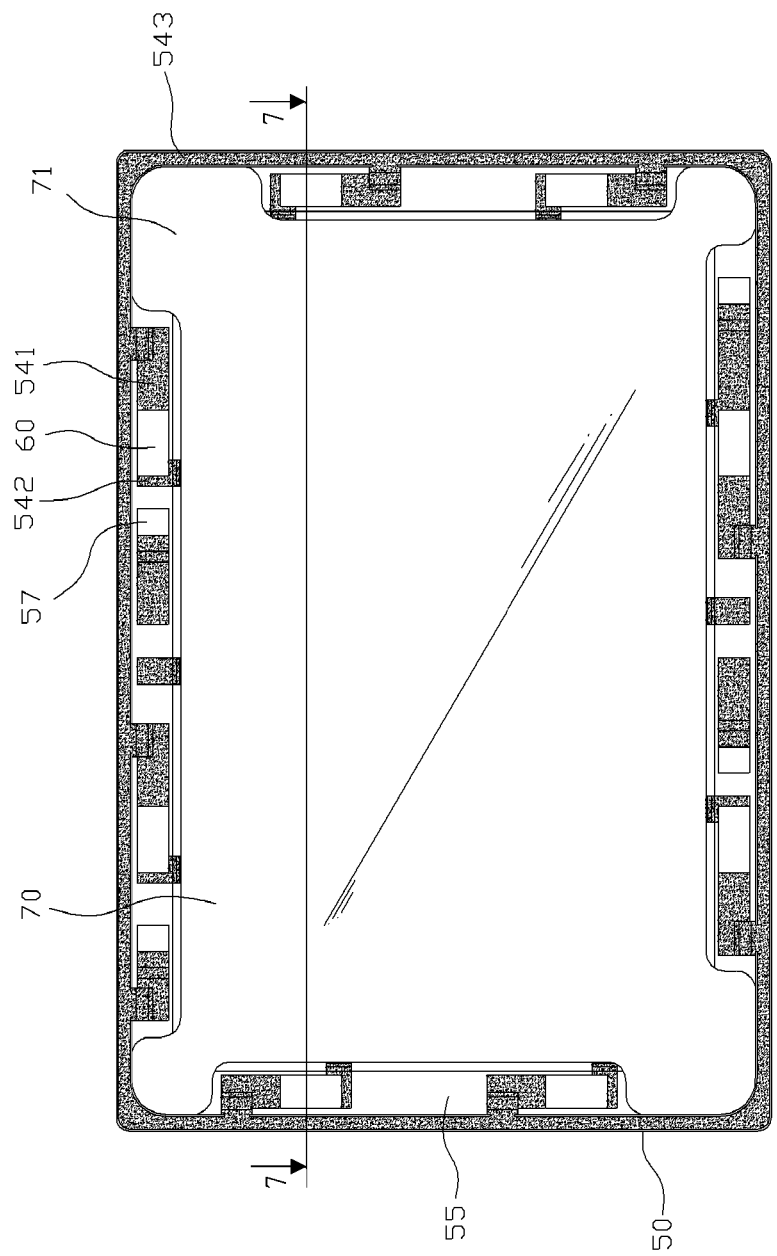
FIG. 5 is a top plan view of the light guiding structure of the exemplary embodiment.

Please also refer to FIG. 5. The first conductive portions 541 are series-connected with each other by a first connecting portion 543, and the first connecting portion 543 is assembled at the upper surface 51 of the frame 50. The second conductive portions 542 are series-connected with each other by a second connecting portion 544, and the second connecting portion 544 is assembled at the support base 55.

Figure 6:
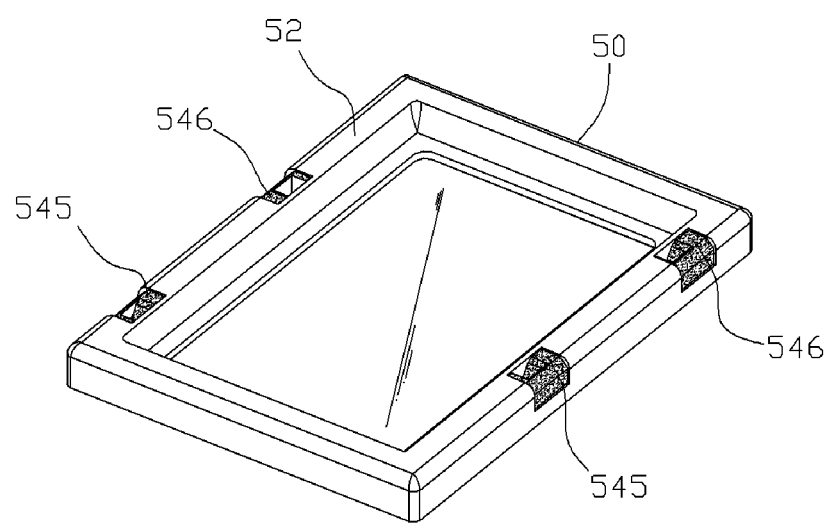
FIG. 6 is a perspective (2) of the light guiding structure of the exemplary embodiment.

Furthermore, please refer to FIG. 6, a plurality of through holes 57 is defined on the recessed portion 55 and through the frame 60, from the upper surface 51 to the lower surface 52, such that parts of the first conductive portions 541 and parts of the second conductive portions 542 are passing through the through holes 57 and extended to the lower surface 52 to form at least one first contact 545 and at least one second contact 546, respectively. Therefore, the frame 50 is electrically connected to and fixed with the circuit board 20 through the first contact 545 and the second contact 546.

In practice, the first conductive portions 541 and the second conductive portions 542 may be not connected with each other, and the first conductive portions 541 and the second conductive portions 542 are extended to the lower surface 52 of the frame 50 to form a plurality of first contacts 545 and a plurality of second contacts 546. Alternatively, the first conductive portions 541 and the second conductive portions 542 may be parallel-connected with each other. In addition, the number of the first contact 545 and that of the second contact 546 can be adjusted according to different circuit boards 20.

The side-emitting LEDs 60 are assembled to the frame 50. Each of the side-emitting LEDs 60 corresponds to one of the conductive pairs 54, and is electrically connected with the first conductive portion 541 and the second conductive portion 542 of the conductive pair 54 (i.e., a side-emitting LED 60 corresponds to a conductive pair 54, and the side-emitting LED 60 is electrically connected with a first conductive portion 541 and a second conductive portion 542 of the conductive pair 54). Therefore, because of the conduction between the circuit board 20 and the side-emitting LEDs 60, the side-emitting LEDs 60 can emit light toward the hollowed portion 53 of the frame 50.

The light guiding sheet 70 is assembled on the support base 56 of the frame 50 and located above the hollowed portion 53, so that the side-emitting LEDs 60 are assembled around the periphery of the light guiding sheet 70. Therefore, the light emitted from the side-emitting LEDs 60 can enter the light guiding sheet 70 and be deflected by the light guiding sheet 70. Therefore, the light guiding sheet 70 can be illuminated.

Besides, four protruded portions 71 are respectively formed at four corners of the light guiding sheet 70 and protruded outward. The protruded portions 71 are covered on the recessed portion 55 of the frame 50. Specifically, two protruded portions 71 on the same diagonal line are corresponding with each other in shape. That is, for example, the upper right protruded portion 71 and the lower left protruded portion 71 have the same shape, and the upper left protruded portion 71 and the lower right protruded portion 71 have the same shape, respectively. Consequently, the protruded portions 71 are mated with the frame 50 to fix the light guiding sheet 70 with the frame 50.

Figure 7:
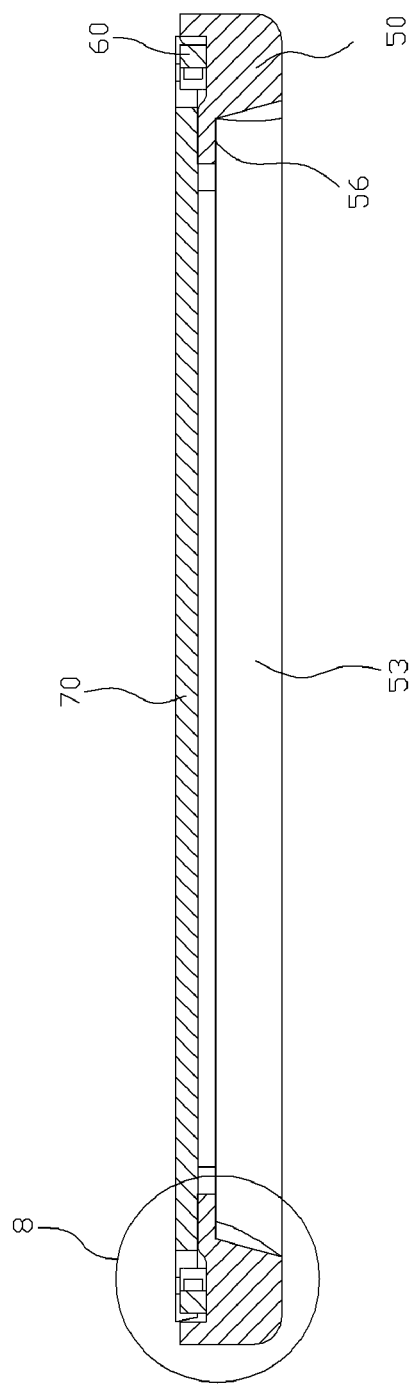
FIG. 7 is a sectional view of the light guiding structure of the exemplary embodiment.
Figure 8:
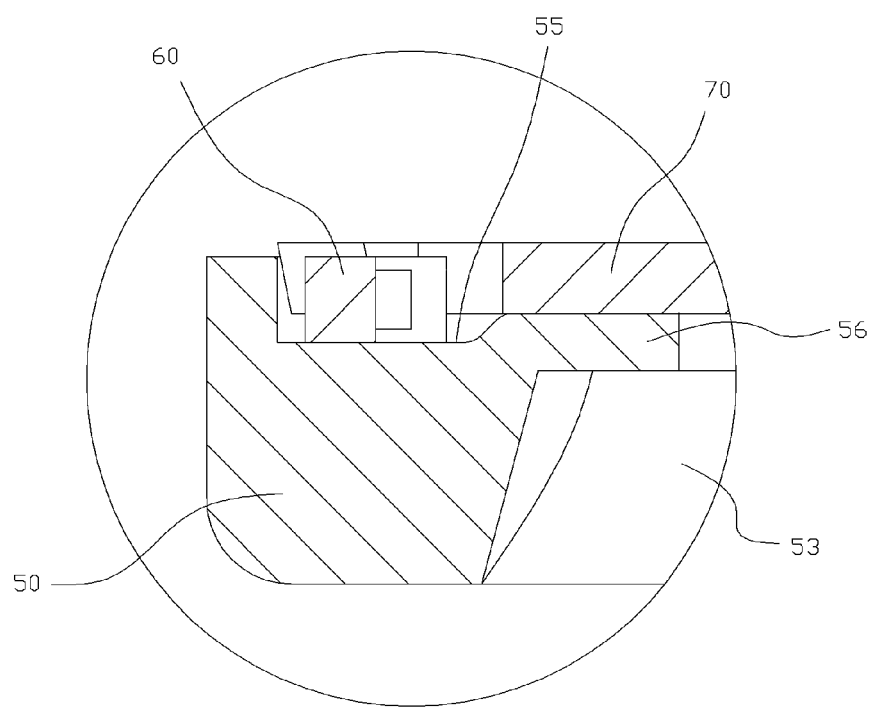
FIG. 8 is a partial enlarged view of FIG. 7.

As shown in FIG. 2, FIG. 7, and FIG. 8, the frame 50 has the hollowed portion 53. Therefore, the frame 50 can efficiently encompass the image capture device 30 when the frame 50 is fixed with the circuit bard 20 via the first contact 545 and the second contact 546.

Besides, the side-emitting LEDs 60 are assembled in the recessed portion 55 of the frame 50 and assembled to the periphery of the light guiding sheet 70. Therefore, the light emitted from the side-emitting LEDs 60 can enter the light guiding sheet 70 to uniformly illuminate the light guiding sheet 70.

When a user put his/her finger directly on the light guiding sheet 70 or on the protecting sheet 40 right above the light guiding sheet 70, the image capture device 30 can capture the fingerprint of the user's finger clearly since the light guiding sheet 70 is uniformly illuminated. Therefore, the fingerprint can be recognized with higher successful rate.

Additionally, since the side-emitting LEDs 60 are integrated in the frame 50, the light guiding structure 10 can be fixed on the circuit board 20. Therefore, steps for manufacturing an electronic device having the light guiding structure 10 for fingerprint recognition can be reduced, and the cost is reduced. Moreover, the size of the electronic device can be reduced to achieve a light weight manner since the image capture device 30 is individually assembled on the circuit board 20 and encompassed by the light guiding structure 10.

In assembling, the frame 50 is assembled on the circuit board 20, and the light guiding sheet 70 is assembled below the protecting sheet 40 and corresponding to the frame 50. And then, the circuit board 20 is assembled with the protecting sheet 40. Under this arrangement, the image capture device 30 can be assembled to the hollowed portion 53 of the frame 50, and the image capture device 30 can perform more efficient performance in fingerprint capturing. Accordingly, a fingerprint recognizing sheet having the light guiding structure can be provided.

According to the above-mentioned embodiments, the light guiding structure 10 can provide a sufficient illumination for fingerprint recognition. In addition, the electronic device having the light guiding structure 10 is light weighted.

While the disclosure has been described by way of examples and in terms of preferred embodiments, it is to be understood that the invention is not limited to the disclosed embodiments. On the contrary, the intent is to cover various modifications and similar arrangements, which are within the spirit and scope of the appended claims, the scope of which should be accorded the broadest interpretation so as to encompass all such modifications and similar structures.

What is claimed is:

1. A light guiding structure for fingerprint recognizing sheet adapted to be assembled on a circuit board to encompass an image capture device, the light guiding structure comprising:
    a frame defined a hollowed portion at the middle portion thereof, wherein the frame has an upper surface and a lower surface, a plurality of conductive pairs is on the upper surface, each of the conductive pairs comprises a first conductive portion and a second conductive portion spaced from the first conductive portion, wherein the first conductive portions are connected with each other in series connection and partly extended to the lower surface to form at least one first contact, and wherein the second conductive portions are connected with each other in series connection and partly extended to the lower surface to form at least one second contact;
    a plurality of side-emitting LEDs assembled to the upper surface of the frame, each of the side-emitting LEDs corresponds to one of the conductive pair and is electrically connected with the first conductive portion and the second conductive portion of the conductive pair; and
    at least one light guiding sheet covering on the hollowed portion of the frame, wherein sidewalls of the light guiding sheet are near to the side-emitting LEDs, and the side-emitting LEDs are assembled around the periphery of the light guiding sheet.

2. The light guiding structure according to claim 1, wherein a recessed portion is recessed from the upper surface, the recessed portion is located at the periphery of the hollowed portion, and the conductive pairs are assembled at the recessed portion.

3. The light guiding structure according to claim 2, wherein a support base is protruded toward the hollowed portion from the recessed portion, the support base is located at the periphery of the hollowed portion to support the light guiding sheet.

4. The light guiding structure according to claim 3, wherein the first conductive portions are series-connected with each other by a first connecting portion, the second conductive portions are series-connected with each other by a second connecting portion, and wherein the first connecting portion is assembled at the upper surface, the second connecting portion is assembled at the support base.

5. The light guiding structure according to claim 2, wherein a plurality of through holes is defined on the recessed portion and through the frame, the first conductive portions and the second conductive portions are passing through the through holes and extended to the lower surface to form the first contact and the second contact.

6. The light guiding structure according to claim 1, wherein four protruded portions are respectively formed at four corners of the light guiding sheet and protruded outward.

7. The light guiding structure according to claim 6, wherein two protruded portions on the same diagonal line are corresponding with each other in shape.

8. A light guiding structure for fingerprint recognizing sheet adapted to be assembled on a circuit board to encompass an image capture device, the finger recognizing device comprising:
    a frame defined a hollowed portion at the middle portion thereof, wherein the frame has an upper surface and a lower surface, a plurality of conductive pairs is located on the upper surface, each of the conductive pairs comprises a first conductive portion and a second conductive portion spaced from the first conductive portion, wherein the first conductive portions and the second conductive portions are respectively extended to the lower surface to form a plurality of first contacts and a plurality of second contacts;
    a plurality of side-emitting LEDs assembled to the upper surface of the frame, each of the side-emitting LEDs corresponds to one of the conductive pairs and is electrically connected with the first conductive portion and the second conductive portion of the conductive pair; and
    at least one light guiding sheet covering on the hollowed portion of the frame, wherein sidewalls of the light guiding sheet are near to the side-emitting LEDs, and the side-emitting LEDs are assembled around the periphery of the light guiding sheet.

9. The light guiding structure according to claim 8, wherein a recessed portion is recessed from the upper surface, the recessed portion is located at the periphery of the hollowed portion, and the conductive pairs are assembled at the recessed portion.

10. The light guiding structure according to claim 9, wherein a support base is protruded toward the hollowed portion from the recessed portion, the support base is located at the periphery of the hollowed portion to support the light guiding sheet.

* * * * *